US006996613B1

(12) United States Patent
Schröder

(10) Patent No.: US 6,996,613 B1
(45) Date of Patent: Feb. 7, 2006

(54) SYSTEM FOR STORING AND TRANSMITTING HOME NETWORK SYSTEM DATA

(75) Inventor: Ernst F. Schröder, Hannover (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/830,104

(22) PCT Filed: Oct. 21, 1999

(86) PCT No.: PCT/EP99/07978

§ 371 (c)(1), (2), (4) Date: Apr. 23, 2001

(87) PCT Pub. No.: WO00/27127

PCT Pub. Date: May 11, 2000

(30) Foreign Application Priority Data

Nov. 2, 1998 (DE) ................................. 198 50 574

(51) Int. Cl.
*G06F 15/173* (2006.01)

(52) U.S. Cl. ..................... 709/224; 709/217; 709/235; 710/301; 710/109; 710/305; 710/46; 710/15

(58) Field of Classification Search ............... 709/224, 709/217, 235; 455/428, 433, 127.1, 445; 710/301, 109, 305, 46, 15
See application file for complete search history.

(56) References Cited

U.S. PATENT DOCUMENTS 5,594,786 A * 1/1997 Chaco et al. ............ 379/93.09

6,032,202 A * 2/2000 Lea et al. ....................... 710/8
6,052,733 A * 4/2000 Mahalingam et al. ....... 709/235

(Continued)

FOREIGN PATENT DOCUMENTS

DE 19530596 2/1997
EP 0932275 7/1999

OTHER PUBLICATIONS

W.Y. Chen "Emerging home digital networking needs", 1997 Fourth Int'l Workshop on Community Networking Proceedings, Sep. 11-12, 1997, IEEE, pp. 7-12.

(Continued)

*Primary Examiner*—Anthony Knight
*Assistant Examiner*—Thomas Pham
(74) *Attorney, Agent, or Firm*—Joseph S. Tripoli; Robert D. Shedd; Paul P. Kiel

(57) ABSTRACT

The invention specifies a system having a plurality of devices which are connected to one another via an IEEE 1394 interface and one of which contains a control unit which, when operated appropriately by a user, polls system data for devices in this system via the interface and passes this system data to an output unit of this device. The device having the output unit is, by way of example, a set-top box having a microprocessor which a user uses to poll system data for the devices, which contains, in particular the input and output characteristics of the latter, via the interface and which the user can use to store this system data on a smart card by means of a write/read device. Alternatively or at the same time, the system data can be shown on a display or transmitted to a desired address via a modem connection. As a result, the user of the system can receive expert advice from a specialist dealer or a customer service point regarding which devices he can best add to his system; or if a point of failure or faults arise.

6 Claims, 1 Drawing Sheet

Figure 1:
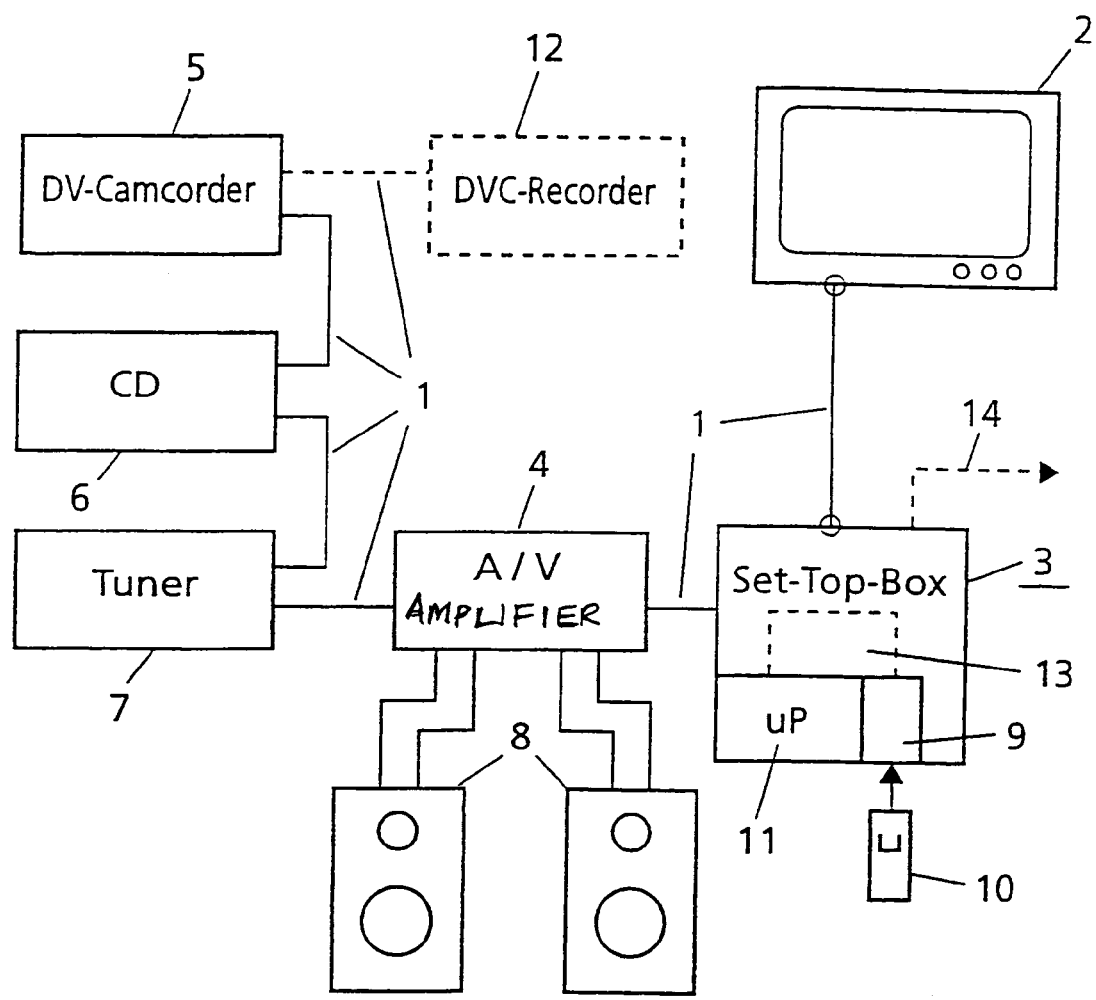

U.S. PATENT DOCUMENTS 6,112,085 A * 8/2000 Garner et al. ............... 455/428
6,122,758 A * 9/2000 Johnson et al. .............. 714/47
6,266,809 B1 * 7/2001 Craig et al. ................. 717/173
6,496,862 B1 * 12/2002 Akatsu et al. .............. 709/224

OTHER PUBLICATIONS

"Audio und Video im Heim-Netzwerk" Funkschaw, vol. 63, No. 6, Mar. 8, 1991, pp. 74, 76, 78-79.

* cited by examiner

SYSTEM FOR STORING AND TRANSMITTING HOME NETWORK SYSTEM DATA

This application claims the benefit of German application Ser. No. 19850574.4 filed Nov. 2, 1998, which is hereby incorporated herein by reference, and which claims the benefit under 35 U.S.C. § 365 of International Application PCT/EP99/07978, filed Oct. 21, 1999, which was published in accordance with PCT Article 21(2) on May 11, 2000 in English.

The invention relates to a system having a plurality of devices connected to one another via digital interfaces. Furthermore, the invention relates to a device for writing to a mobile data medium for use in the system and to a mobile data medium for use in the system.

PRIOR ART

The invention is based on a system having a plurality of devices connected to one another via an IEEE 1394 interface. Devices of this type are known for home applications, for example, and it is expected that these devices will become established on the market as mass-produced products in connection with digital television and digital recording methods.

Entertainment electronics devices are produced by many manufacturers in a great variety of design forms widely ranging in quality and price. Hence, users frequently combine devices from different manufacturers for a music and/or video system. What they often do not know, however, is which devices go together best or whether the devices are completely compatible with one another.

The digital interface IEEE 1394, also called "Firewire", connects the devices to form a system via which, for example, video data, audio data or system data is transmitted. This system is able, amongst other things, to configure itself when additional devices are connected, even during continuous operation (hot plugging). When a new device is connected to the IEEE 1394 interface, a reset is triggered, irrespective of the particular state of the interface. After the reset, the structure of the interface is determined again and physical addresses are allocated for the purpose of self-identification.

As a result, however, a user no longer has direct access to the configuration data, as this is generated internally. It is, of course, possible to show or print this configuration data, for example using a PC, but a user will frequently not know the configuration of his system precisely. Hence, he will not know what device supplements his system best if he wishes to add a further device.

Digital video devices having an IEEE 1394 interface are already known. Minicomputers (PC or laptop) can also have this interface fitted. An insight into the way in which the IEEE 1394 interface works and possibilities for its use is given in the brochure SPECSinternational, Vol. 10, No 4, July/August 1998 from Cable Television Laboratories, Inc., Louisville, USA. For the interface itself, the standard IEEE Std 1394-1995 was created, entitled "IEEE Standard for a High Performance Serial Bus", IEEE 1996.

INVENTION

The object of the present invention, therefore, is to specify a system of the type mentioned above which gives a user the option of adding further devices to the system without difficulty.

This object is achieved by the features of the invention which are specified in claim 1. Advantageous developments of the system and devices in the system are specified in the further claims.

With the system according to the invention, a user can poll the system data for devices in this system via the IEEE 1394 interface using a control unit arranged in one of the devices, and can pass this system data to an output unit of this device. The output unit is, by way of example, a device for writing to a mobile, digital data medium which stores the system data. The system data for a device contains, in particular, the input and output characteristics of the latter. As a result, the user can take the data medium with its system values to a specialist dealer or technical customer service point and hence receive very specific advice about his home system.

Instead of storing the system data on a digital data medium, it is alternatively also possible to transmit the system data via a modem or other analogue or digital telecommunication connection to an appropriate specialist dealer or customer service point, or to show it on a display, so that the owner can take note of it. A further advantage is that this system data can locate or at least isolate a point of failure or malfunction, so that these faults can be eliminated more quickly. In complex digital systems having a plurality of devices, it is frequently difficult to locate malfunctions or associate them with a particular device.

One of these devices contains, in particular, a control unit which, when operated appropriately by a user, polls relevant system data for connected devices via the interface and uses a device to store this system data on the data medium. Data media can be, in particular, a smart card or a chip card having a semiconductor memory. A suitable central device which can be used to retrieve and store the system data is, in particular, a set-top box or a digital satellite receiver, some of which are already equipped with write/read devices for a smart card.

Alternatively, a minicomputer, such as a PC or laptop, which can likewise be connected to the IEEE 1394 interface can also be used, however, so that the system data can be stored on a floppy disk, for example. Relevant system data and characteristic data for a device used in the system are, in particular, serial number, manufacturer's mark, input and output characteristics, device class, software version and/or any error data.

DRAWINGS

The invention is explained in more detail below by way of example and with the aid of a schematic drawing, in which:

FIG. 1 shows a system having entertainment electronics devices connected to one another via an IEEE 1394 interface.

DETAILED DESCRIPTION OF THE INVENTION

The system shown in the FIGURE contains audio and video devices from the field of consumer electronics, which are connected to one another via an IEEE 1394 interface 1. In this case, a television set 2 is connected to a set-top box 3 by means of this interface 1 and to a digital camcorder 5 via an A/V amplifier 4. Other devices in this system are a CD player 6 and a tuner 7. The loudspeakers 8 are connected to the A/V amplifier 4.

The set-top box 3 contains a device 9 for reading and writing to a mobile digital data medium 10; in this illustrative example, the device 9 is a smart-card reader for a corresponding smart card having a non-volatile memory. The set-top box 3 also contains a control unit 11, for example a microprocessor, which can be used by a user of the set-top box to retrieve system data from all devices or from individual devices in this system via the interface 1. A set-top box is suitable for this since it already has a device 9 for writing to a smart card 10 anyway. The control unit 11 can be instructed [lacuna] keypad arranged above another set-top box 3, for example.

Alternatively, other devices in the system can also be used for storing the system data, for example the A/V amplifier 4 if it has a write/read device for a suitable chip card, or a digital satellite receiver if it is used instead of the set-top box 3.

If a user has stored his system data on the data medium 10, he can take this system data to a specialist dealer or to a customer service point, where it is read and the user can then be advised. If the user also wishes to buy a digital video recorder 12, for example, in order to transfer video recordings from the digital video camcorder 5, the specialist dealer can read out the system data on the data medium 10 and recommend to the customer a device matching the performance of the digital camcorder 5. Similarly, the user can be advised by a specialist dealer in the event of system faults, provided that system data can still be retrieved and stored on the data medium 10 via the interface 1.

The interface 1 also allows the devices in the system to be installed in different rooms, for example the digital camcorder 5 and the digital video recorder 12 can be installed in a work room and the other devices in the audio and video system 2–4, 6, 7 can be installed in a living room. Using the set-top box 3 and the control unit 11, the user can, in this case, too, ascertain the status of all connected devices at any time, or can monitor which devices are connected. In addition, a minicomputer in the work room can also be connected to the system via an IEEE 1394 interface, so that this computer can also retrieve the system data for the devices 2–7 and store it on a floppy disk, for example.

The invention has been explained using the example of a system of a plurality of devices connected to one another via the IEEE 1394 bus. Hence, it is expressly pointed out that the invention can also be used when a plurality of devices are connected using other communication bus systems. Examples are the USB, CAN, Interbus, Ethernet, IBM Token Ring etc. bus systems. Alternatively or in addition, the device having the control unit 11, the set-top box 3 in this illustrative example, can have a display 13 which can show the polled system data when an appropriate command is given. A further refinement of the invention is for the polled system data to be transmitted to a desired address, for example to a specialist dealer or a customer service point, via an available modem connection 14 when an appropriate user command is given.

What is claimed is:

1. Home system having a plurality of devices connected to one another via a home bus interface, in particular an IEEE 1394 bus interface, wherein one of the devices contains a control unit which, when operated appropriately by a user, polls system data for other devices in this system via the home bus interface, wherein said system data comprises characteristic data for a device, in particular a serial number, the manufacturer's mark, the device class, output/input characteristics, the software version or any error data and passes this system data to an output unit of the one device, the output unit being a device for writing to a mobile, digital data medium which can store the system data, wherein the mobile, digital data medium is one of a smart card and a chip card having a memory, and in that, when operated appropriately by a user, the control unit in the one device stores system data for the connected other devices on one of the smart card and the chip card using the device.

2. Home system according to claim 1, wherein the one device having the device for writing to the data medium is one of a set-top box and a digital satellite receiver having a write/read device for one of a chip card and a smart card.

3. Home system according to claim 1, wherein the one device having the device for writing to the data medium is a minicomputer having a drive for one of a floppy disk and another data medium having one of a magnetic and optical storage medium.

4. Device for the home system according to claim 1, wherein the one device contains a control unit which, when operated appropriately by a user, polls system data for the connected other devices via an interface wherein the one device includes a device for writing to a mobile, digital data medium and wherein the device stores this system data on the data medium using the device.

5. Device for the home system according to claim 1, wherein the one device contains a control unit which, when operated appropriately by a user, or when an appropriate remote polling code is received, polls system data for the connected other devices via an interface wherein the one device includes a modem or another telecommunication connection which can send the polled system data to a desired address.

6. Device according to claim 5, wherein user operation corresponds to remote control in the context of a remote polling code transmitted via communication line or by radio.

* * * * *